Sept. 5, 1939.  F. L. VAN ALLEN  2,172,268
DOUGH TWISTING MACHINE
Filed Sept. 21, 1936  4 Sheets-Sheet 1
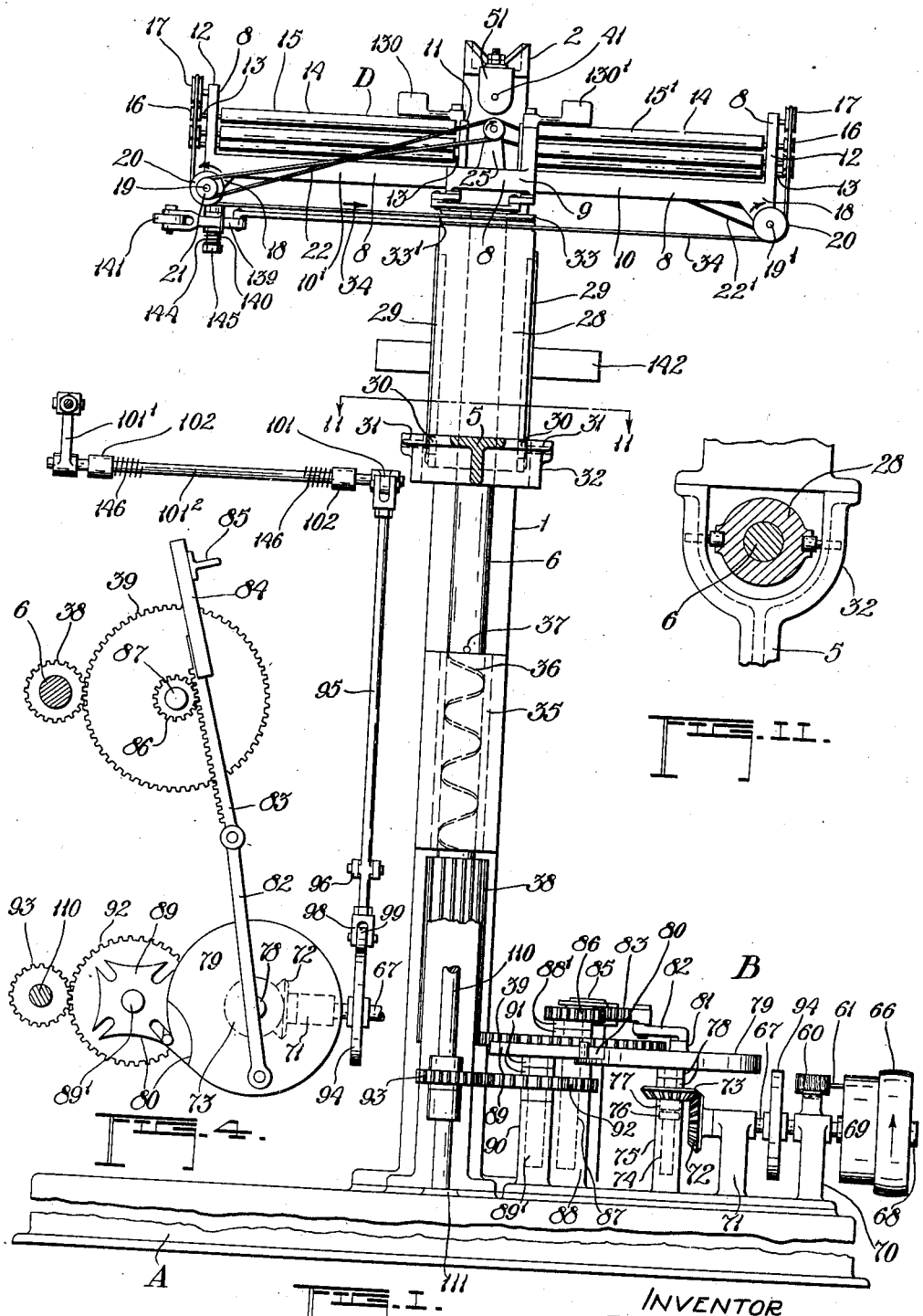
INVENTOR
F. L. VAN ALLEN
BY
Featherstonhaugh &Co.
ATTYS.

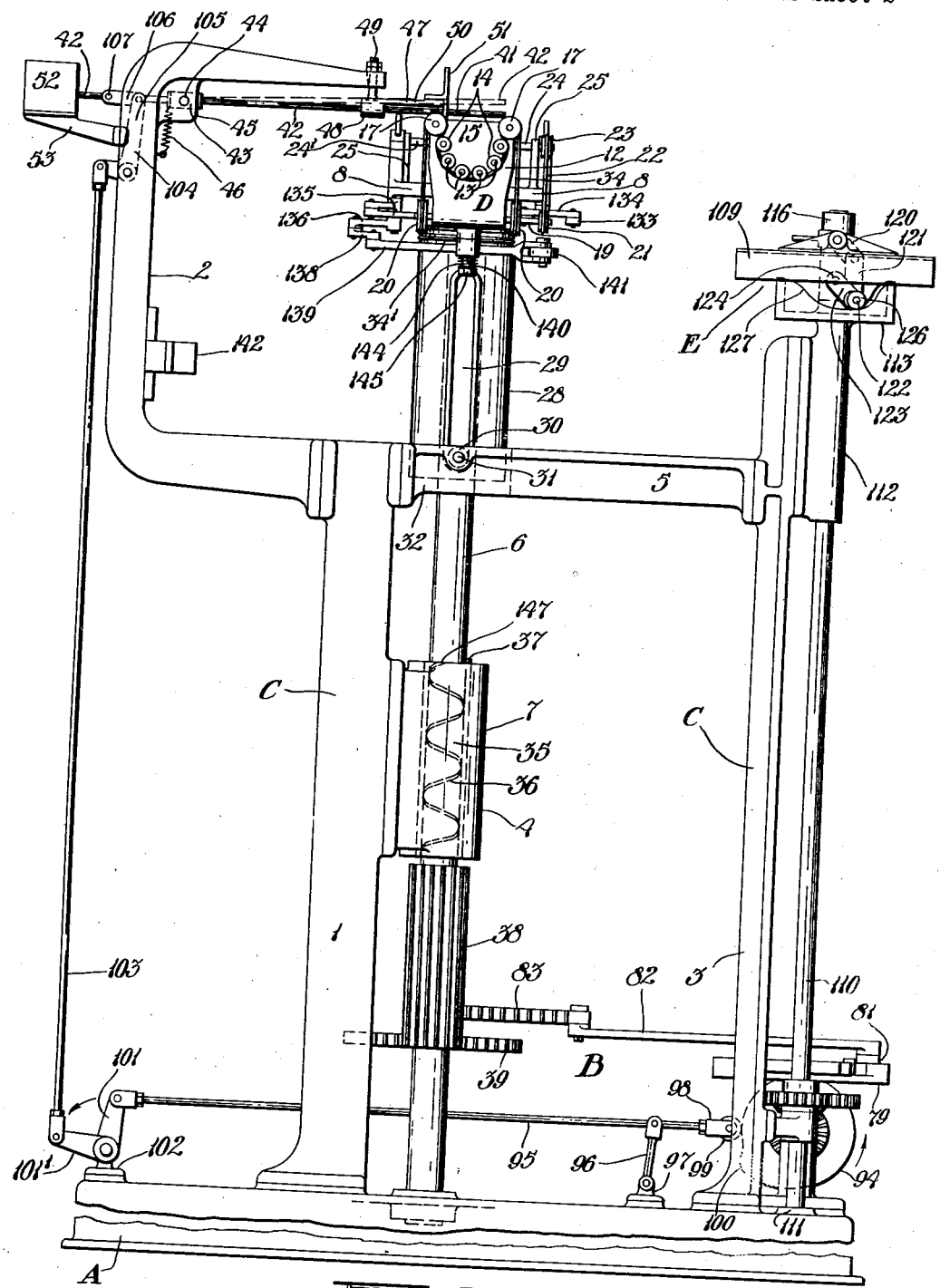

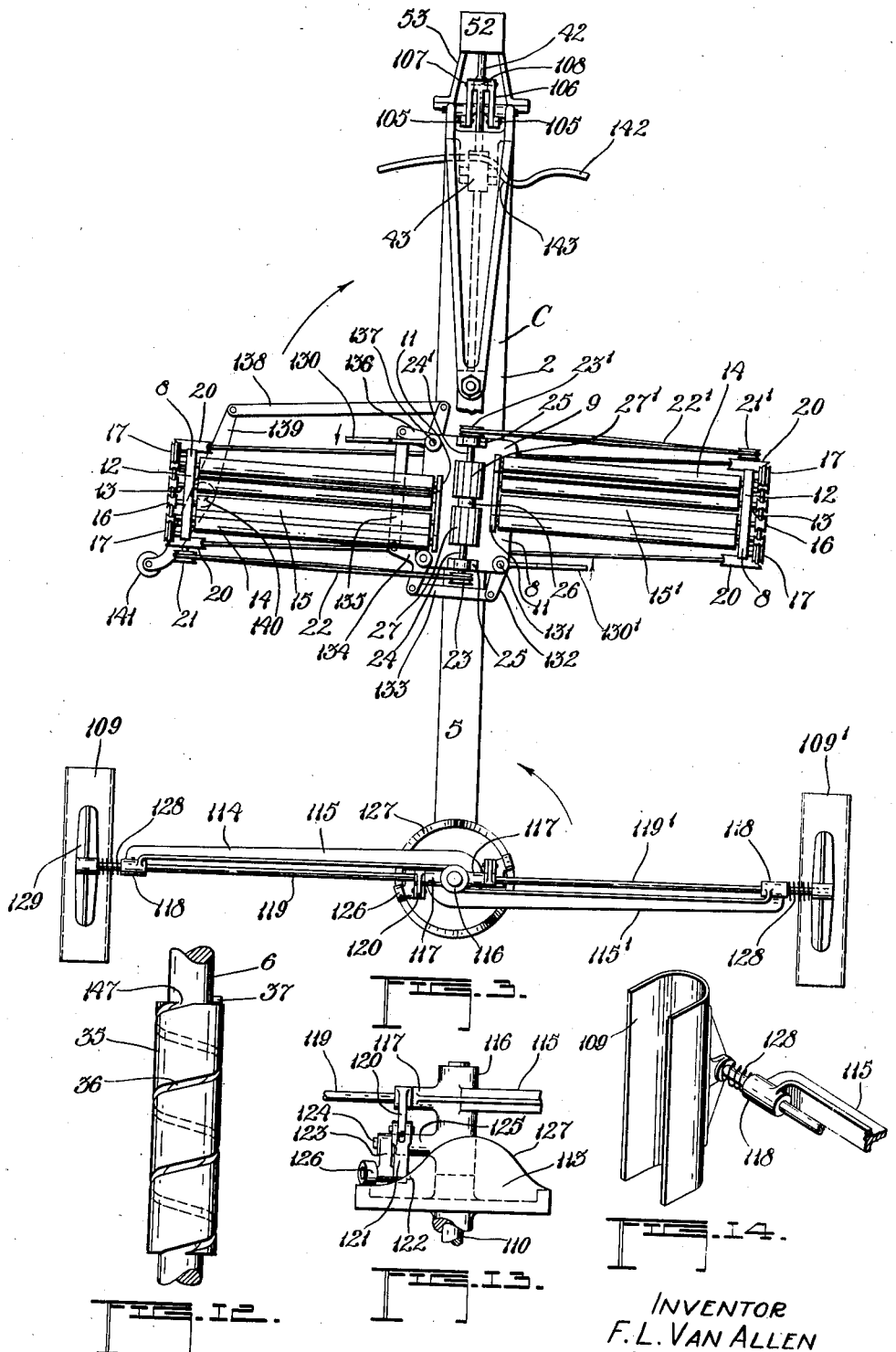

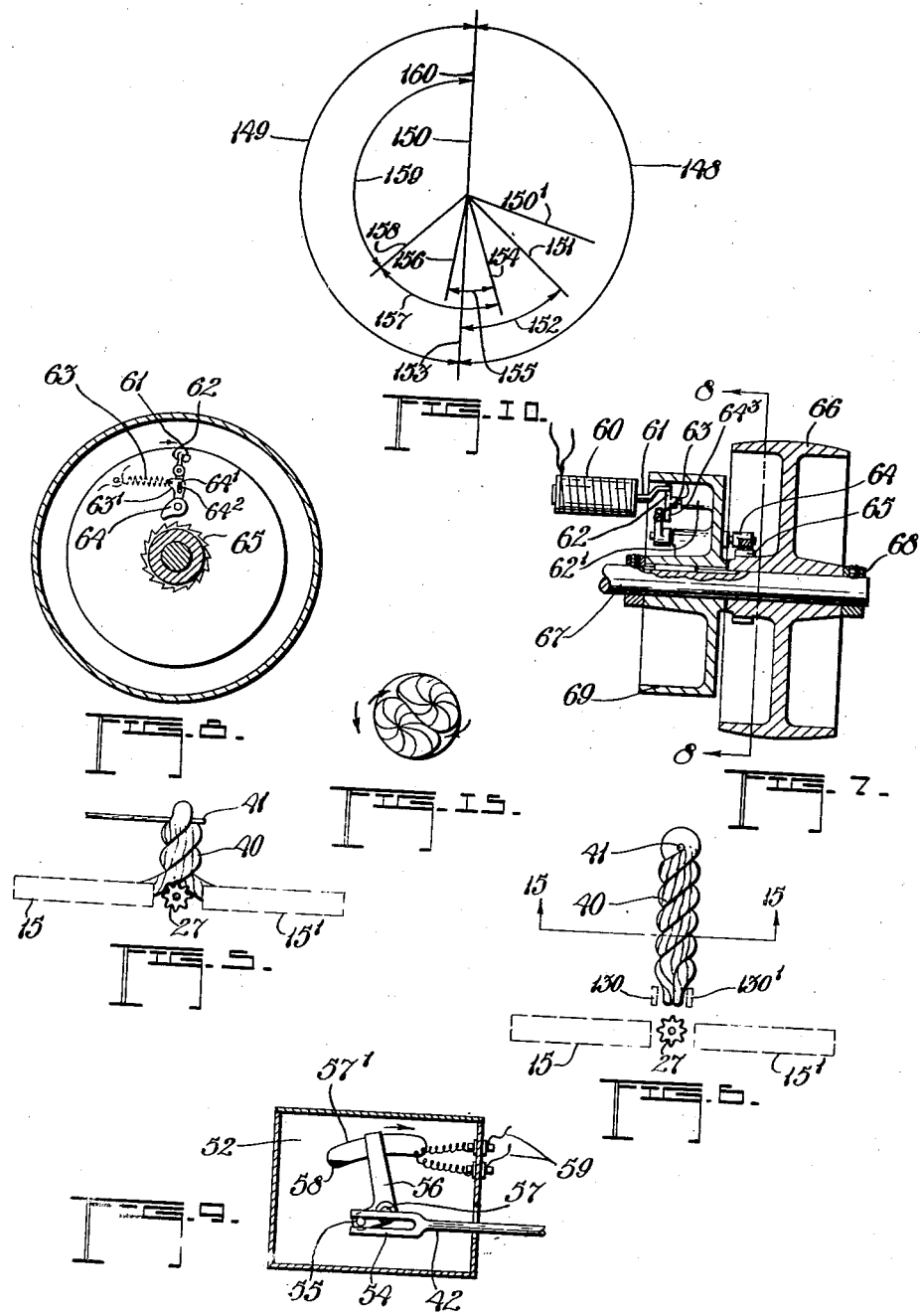

Patented Sept. 5, 1939

2,172,268

UNITED STATES PATENT OFFICE 2,172,268

DOUGH TWISTING MACHINE

Frederic Langtry van Allen, Winnipeg, Manitoba, Canada, assignor of twenty-two and one-half per cent to Ambrose Paoli, twenty-two and one-half per cent to Clifford N. Lush, and twenty per cent to Cecil C. Kent, all of Winnipeg, Manitoba, Canada Application September 21, 1936, Serial No. 101,877

17 Claims. (Cl. 107—8)

My invention relates to improvements in dough twisting machines, an object of the invention being to provide a device which will receive an elongated strip of rolled dough, fold the same at the center thereof, and twist the two halves of the strip each around the other, simultaneously imparting a twist to each half of the strip itself so that when each half of the strip is twisted around the other, there will be no tendency to untwist in view of the tortion existing in each half of the strip.

A further object of my invention is to provide means for twisting bread dough which will not possess a heavily floured surface.

A further object of my invention is to provide a device which will receive an elongated strip of rolled dough and will twist the two halves thereof about each other and discharge the same from the machine at relatively high speed.

A further object of my invention is to provide a machine of the character herewithin described which will successfully discharge twisted dough strips therefrom.

A further object of my invention is to provide a device for twisting rolled dough in such a way that the strands thereof will remain twisted about each other from end to end.

A further object of my invention is to provide means for twisting a strand of rolled dough about itself and in association with means for pinching one end of the strand, afterwards discharging the same from the machine.

With the above more important objects in view and such other minor objects as may appear as the specification proceeds, my invention consists essentially in the arrangement and construction of parts all as hereinafter more particularly described, reference being had to the accompanying drawings, in which:

Fig. 1 is a front elevation of my machine, certain parts thereof being shown broken.

Fig. 2 is a side elevation of Figure 1.

Fig. 3 is a plan view of my invention.

Fig. 4 is a plan view of a portion of the actuating mechanism.

Fig. 5 is an illustration showing a strip of bread dough partially twisted and hanging on the peg, the troughs being in course of their downward spiral travel, the peg being shown in side elevation.

Fig. 6 is an illustration showing the strip of twisted bread dough hanging vertically on the peg in the act of being pinched and immediately prior to being wiped thereoff, the troughs having nearly reached the lower end of their downward spiral travel, the peg being shown in front elevation.

Fig. 7 is a sectional elevation of my clutch mechanism and driving pulley, showing the solenoid in side elevation.

Fig. 8 is a section taken on the line 8—8 Figure 7.

Fig. 9 is an interior view of the switch box.

Fig. 10 is a diagrammatic view illustrating approximately the sequence of actions which take place in my machine during one revolution of the driving pulley.

Fig. 11 is a section upon the line 11—11 Figure 1.

Fig. 12 is a perspective view of my spiral insert viewed in situ from the left side of the machine.

Fig. 13 is a detail of the follower mechanism associated with the wiping arrangement.

Fig. 14 is a perspective detail of my wiper plate and associated mechanism.

Fig. 15 is an illustration upon the line 15—15 of Figure 6, showing the manner in which the individual strands of the twisted dough strip are wound against each other, the outer arrow indicating the direction of the coils about each other and the inner arrows indicating the direction of torsion in the individual strands.

In the drawings like characters of reference indicate corresponding parts in the different figures.

My invention consists essentially of a bed plate A upon which is mounted the main drive mechanism B actuating my device, a vertically disposed standard assembly C being secured to the bed plate.

Situated at the apex of the standard assembly, I provide a rotatable head section D in front of which is located wiping mechanism E.

The general principle of operation which will be hereinafter more fully described consists of means for rotating the head section in a spiral path upon a main vertical shaft, the head section consisting essentially of a pair of offset parallel lying opposed troughs into which an elongated strip of rolled bread dough is deposited, the center of the strip falling over a peg which projects in a horizontal direction above and between the two troughs, the troughs themselves consisting of a plurality of rollers which twist the two halves of the strip of dough against each other as the head spirals downwardly, in this way causing the strip of dough to gradually assume a hanging position upon the peg, feed rollers means being provided between the troughs to control the rate at which the two halves of the dough strip feed into the twisted state, the two halves being twisted around each other, each half being twisted by the rollers of the trough in which it is deposited, the one in a clockwise direction and the other in a counter clockwise direction, thus imparting to each half of the strip an inherent twist against the other, thereby preventing the elasticity of the dough from asserting itself, by this means utilizing the untwisting tendency of each half, which tendency causes the one half of the dough strip to exert through frictional engagement, a twist to the other half, further means being provided when the twisted dough is hanging in a vertical position upon the peg for wiping the same off the peg onto a suitable surface which forms no part of this invention.

Mechanism is also provided to pinch the lower end of the twisted strip immediately prior to its being wiped off the peg.

My standard assembly C which is mounted upon the bed plate A, consists of a vertically disposed casting 1 to which is secured a head bracket 2 of the configuration clearly shown in Figure 2. In front of the casting 1 is an upright 3 to the apex of which is attached a vertically disposed cylindrical sleeve 112, a tie bar 5 being horizontally disposed and attached at each end to the members 1 and 3 respectively in the manner shown.

Journalled for rotation in the bed plate A is a vertically disposed main spindle 6, the spindle being located adjacent to and in front of the casting 1 and held in vertical position by the sleeve 4 which serves as an elongated bearing 7. The spindle 6 extends between the tie bar 5 which is suitably forked to receive the same and terminates in a head casting 8 to which it is rigidly secured, thus enabling the casting to be rotated with the rotation of the spindle. The head casting consists of a central portion 9 and a pair of horizontally disposed and offset arms 10 and 10¹. Inner end plates 11 are disposed upon the center portion 9 in offset relation to each other, outer end plates 12 being formed upon the ends of the arms 10 and 10¹ in opposed relation to the inner end plates.

The inner and outer end plates are provided with a plurality of drillings arranged in a semicircle and within each of these drillings is journalled the axle 13 of a horizontally disposed roller 14, the number of rollers being arbitrary, six being shown in the embodiment illustrated. These rollers, arranged in semicircular relation to each other, thus form a pair of offset and parallel opposed troughs 15 and 15¹.

At the outer end of each of the axles 13 is a pulley 16, which is keyed thereto and the arrangement is such that a belt later to be described, which is in peripheral engagement with each pulley, will cause the rollers of the troughs 15 and 15¹ to rotate in opposite directions, the rollers of the trough 15 rotating in a clockwise direction when viewed from the right, and the rollers of the trough 15¹ rotating in a counter clockwise direction due to the fact that the downward spiralling of the head D is in a clockwise direction viewed in plan.

At each upper corner of the outer end plates is a pulley 17, each of these pulleys being mounted upon a short stub shaft which is mounted in the plate 12. The head casting 8 is provided at each end of the arms 10 thereof, with a downwardly projecting ear 18 which serves as a bearing for a pair of short shafts 19 and 19¹ upon each of which is keyed adjacent the ends thereof, a pulley 20.

At the extreme end of the shaft 19 is keyed a smaller pulley 21 and upon the opposite end of the shaft 19¹ is keyed a similar pulley 21¹. Belts 22 and 22¹ engage the pulleys 21 and 21¹ respectively and also engage with pulleys 23 and 23¹ which are keyed to the ends of two separate shafts 24 and 24¹, these shafts being mounted in end bearings 25, the inner ends thereof being journalled in a central bearing 26. Upon each of the shafts 24 and 24¹ is rigidly mounted a longitudinally corrugated roller 27 and 27¹ respectively, the roller 27 rotating in a clockwise direction and the roller 27¹ rotating in a counter clockwise direction due to the fact that the belts 22 and 22¹ are each crossed upon themselves.

Surrounding the main spindle 6, and freely mounted thereupon with its upper end in engagement with the under side of the head casting 8, is a sleeve 28, and upon either side of the sleeve, looking towards the front of the machine, is a vertically disposed flanged slot 29. The sleeve moves vertically up and down with the spiral action of the head section, but is prevented from rotation by means of a pair of roller bearings 30, each of which are secured to a shank 31 which is journalled in the forked bearing portion 32 of the tie bar 5. Adjacent the upper end of the sleeve, I provide a pair of circumscribing grooves 33 and 33¹ formed thereupon, and around which I pass belts 34 and 34¹ respectively. These belts engage in the groove of each of the pulleys 16 so that each semicircular group thereof is caused to rotate the same way and from this arrangement it will be seen that as the head section D spirals in a clockwise direction downwards, viewed in plan, the rollers in the trough 15¹ will rotate in a counter clockwise direction, and the rollers in the trough 15 will rotate in a clockwise direction when viewed from the right, due to the fact that the sleeve 28 is nonrotatable.

By this arrangement, the right hand half of the dough strip will rotate in a clockwise direction and the left hand half in a counter clockwise direction, viewed from the right hand side.

The elongated bearing 7 which is mounted upon the casting 1 is lined with a spiral insert 35 illustrated in Figure 12, this insert being provided with a spiral slot 36 which extends from end to end thereof.

Upon the main spindle 6 is a pin 37 which occupies the position shown in Figures 1 and 2 when the head section is at the top of its travel, while rigidly mounted upon the shaft 6 below the elongated bearing 7 is a broad toothed gear 38.

This gear is rotated by a spur gear 39 and as it is thus rotated, this gear and the shaft 6 upon which it is mounted, together with the head section D and the sleeve 28 travel downwardly, and the lower end of the shaft 6 which is journalled in the floor of the bed plate A, travels downwardly into the hollow body thereof, the bed plate being deep enough to receive that portion of the shaft which moves thereinto.

In the operation of my machine, an elongated strip of rolled dough 40 is deposited from an adjacent conveyor onto the troughs 15, one half of the strip falling into the trough 15 and the other half into the trough 15¹. The center of the strip, however, will fall over a peg 41, the peg being actually the end portion of a shaft 42. This shaft is slidably mounted upon a sleeve 43 which is pivoted as at 44 upon the corner bearing 45 of the head bracket 2.

The shaft 42 is normally held in the position indicated in Figure 2 with chain lines by means of a light spring 46, one end of which is secured to the sleeve 43, the other being clipped to the head bracket 2.

The position shown in full lines is that which this member would occupy when depressed below the horizontal by a casting 47 which in part consists of a sleeve 48 which surrounds the shaft 42, the sleeve being hung upon a bolt 49 having a threaded end which passes through the end of the horizontal arm of the head bracket and is secured by nuts. The shaft 42 is free to end-shift within the sleeve 48 and in the operation later to be described, retracts while the dough is hanging over it. For this reason, the casting 47 consists also in a horizontally disposed extension 50 to the end of which is secured a vertical face plate 51 having an orifice therein through which the peg 41 projects.

This orifice is a sliding fit for the peg and the face plate serves the purpose of preventing any dough which sticks to the peg from being retracted to the rear thereof, thereby avoiding the possibility of any dough fouling the sleeve 48.

The rear end of the shaft 42 extends into a switch box 52 which is mounted by means of the bracket 53 to the head bracket 2. The switch box is of conventional design being illustrated in Figure 9 and forms no part of the present invention but from this figure which is added for illustrative purposes, it will be seen that the rear end of the shaft 42 is provided with a deep forked portion 54 which spans a stud 55, this stud projecting from one arm of a bell crank 56 pivoted above a pin 57.

The upper end of the bell crank is provided with a collar which holds a curved glass tube 57¹ containing mercury 58 and from an inspection of this figure, it will clearly be seen that when the peg 41 is depressed by the weight of the dough, the shaft 42 pivots about the corner bearing 45 and thus moves the bell crank in the direction of the arrow.

This causes the mercury within the tube 57¹ to travel to the opposite end thereof and when it has thus travelled to this location, it causes contact to be established between the terminals of a pair of leads 59, the opposite ends of which are attached to a solenoid 60, which is also of conventional design and forms no part of the present invention. Upon completion of a circuit between the switch box and the solenoid, the curved end 61 of the solenoid armature is retracted.

This permits a pivoted lever 62 mounted on a bearing 62¹ to rotate in the direction of the arrow upon Fig. 8, the rotation being caused by a spring 63, one end of which is suitably secured, while the other is held in tension, being attached to an arm 63¹ forming part of a pivoted pawl 64. The arm 63¹ is provided with a slot 64¹ through which extends a pin 64² projecting outwardly from the pivoted extension 64³ of the lever 62. The pawl is mounted for engagement with a ratchet 65, mounted upon the hub of a driving wheel 66, and from the mechanism just described, can be seen that when the end 61 of the solenoid armature is withdrawn, the lever 62 will spring in a clockwise direction under the influence of the spring 63 which will pull the arm 63¹ in a counterclockwise direction together with the pawl to which it is attached, thereby causing the said pawl to engage with one of the ratchets.

By the time that one revolution of the clutch mechanism and the pulley has been made, the end 61 of the armature is again in projected position and is struck by the lever 62, which at this time is slightly inclined towards the right. When it hits the member 61 it reverts to the position shown, and causes disengagement of the pawl.

The driving pulley 66 is freely mounted upon a main drive shaft 67 being secured thereupon by a collar and set screw 68 and upon this drive shaft is also keyed the housing 69 of the clutch mechanism just described, the main shaft being journalled upon bearings 70 and 71. It should here be noted that the fixed end of the spring 63 is secured to this housing.

Upon contact being established between the switch box 52 and the solenoid with the resultant withdrawal of the pin 61, the pawl and ratchet mechanism just described engage one with the other, thus causing rotation of the main drive shaft 67 one complete revolution in a clockwise direction, viewed from the right of Fig. 1 or the front of the machine.

Upon the end of the main drive shaft 67 is keyed a bevel gear 72 which engages with a horizontally disposed downwardly facing bevel gear 73. This gear is keyed to a spindle 74 which extends vertically within a hollow bearing 75. A collar 76 is provided upon the spindle 74 and the spindle and gear are prevented from rising by means of a second collar 77 which is secured in the upper end of the bearing 75.

The gear 73 and the member 79 are each provided with a hub 78 for the purpose of spacing the one from the other, and located eccentrically upon the upper surface of the member 79, I provide a drilled bearing portion 81 through which extends the angulated end of an arm 82.

This arm is linked to a rack 83, upon the end of which is a rack guide 84 which bears against a vertically disposed T-bar 85 secured at its lower end to the bed plate and so mounted for the purpose of maintaining the toothed edge of the rack 83 in engagement with a pinion 86. This pinion is mounted upon the apex of a shaft 87 which is journalled in a vertically disposed hollow bearing 88 and keyed to the shaft below the pinion 86 and spaced therefrom by means of a pair of hubs 88¹ is located the spur gear 39, already referred to, the hubs 88¹ being those belonging to the pinion 86 and the gear 39.

The ratio of movement which the various members of the aforementioned mechanism bear to each other is such that one complete revolution of the pulley 66 causes three complete revolutions of the gear 38 clockwise, and three counter clockwise which obviously imparts a similar movement to the head section D. Downward spiral of the head section is effected by the course of the pin 37 down the track 36 in the insert 35 and in this connection, it should be noted that prior to entering the slot, the pin rotates around the upper edge of the insert to a predetermined arc of its circumference for a reason later to be described.

The element 89 of the Geneva action 80 is mounted upon a shaft 89¹ journalled within a hollow vertically disposed bearing 90 and below the element 89 and spaced therefrom by a pair of hubs 91 is a pinion 92 engageable with a smaller pinion 93, the hubs 91 forming part of the members 89 and 92.

From the foregoing, it will be seen that upon a partial revolution of the member 79, the rack 83 is end-shifted from the position shown in Fig. 4 to the end at which it is linked to the arm 82 thereof, this in turn causing the rotation of the shaft 6 and head D three complete revolutions. When this has occurred and the head section is at the lower end of its travel, the pin 41 is retracted as previously mentioned, this retraction being effected through the medium of a peripheral cam 94 keyed to the shaft 67, together with rod and crank mechanism.

This rod and crank mechanism consists of an end-shiftable rod 95 mounted upon a link 96 journalled in a bearing 97 secured to the bed plate A. At the forward end of the rod is a ferrule 98 upon which is rotatably mounted a small follower 99 engageable with the cam 94. When the breast 100 of the cam 94 rides over the follower, a bell crank action 101, 101¹, and 101² journalled in a pair of bearings 102 upon the bed plate, is rotated in the direction of the arrow which results in the downward movement of the linked rod 103. The upper end of this rod is mounted upon a bell crank 104 pivoted upon the head bracket 2, the bifurcated arm 105 thereof, being swung to the left when the breast of the cam 94 rides over the follower. A divided link 106, clearly illustrated in Fig. 3, receives at the rear end thereof, a transverse pin 107 which extends through a small bearing 108 formed upon the shaft 42.

Substantially simultaneously with the retraction of the peg 41 in the manner described, the hanging strips of twisted dough are wiped onto a platform by means of one or other of a pair of wiper plates 109 and 109¹ actuated by means of a wiper shaft 110 to which the aforementioned pinion 93 is keyed.

This shaft rests in a bearing 111 in the bed plate A and extends vertically to be maintained in position at its upper end by a cylindrical sleeve 112 which is mounted at the apex of the upright 3. At the apex of the sleeve 112, is a cylinder cam 113 of the configuration clearly shown in Figs. 2 and 3 integral with the cylindrical sleeve and keyed to the apex of the shaft 110 is a casting 114 consisting of a pair of opposed offset arms 115 and 115¹. The center of this casting consists of a hub portion 116 diametrically disposed with respect to which I provide bearings 117.

At the outer end of each of the arms 115 and 115¹ I provide a further bearing 118 in longitudinal alignment with the bearings 117 and through each pair of bearings 117 and 118, I journal a rod 119 and 119¹. The outer ends of each of these rods terminate in the previously mentioned wiper plates 109 and 109¹ to which they are keyed and adjacent the inner end of each rod and also keyed thereto, I provide an offset lug 120 to one end of which is attached a link 121.

The pin 122 extends through the free end of the link 121 and upon this pin is journalled a second link 123, this link normally held at the same angle of inclination as the lug 120. The upper end of the link 123 is provided with a pin 124 which extends into a bearing 125 upon the hub portion 116 below each of the bearings 117.

A follower 126 is journalled upon the end of the pin 122, this follower being designed to ride over the cam surface 127 of the cylindrical cam 113. It should be noted, that the wiper blades 109 and 109¹ are maintained in a horizontal downturned position by means of a spring 128 which encircles the shaft 119 and 119¹, one end of the spring being received into the small drilling in the center portion of the casting 129, the other end of the spring being received into a similar drilling upon the bearing 118.

From the foregoing, it will be seen that upon the rotation a quarter of one revolution of the element 89 of the Geneva action 80 by the member 79, the shaft 110 will rotate 90°, together with the wiper plates which are mounted at the apex thereof. As the wiper plates are rotated in this manner, the cam arrangement just described, will cause the plates to gradually assume a vertical position as they circle towards the peg 41 through the configuration of the cam surface 127 over which the followers 126 ride and as soon as the wiper 109 or 109¹ has passed below the peg, it gradually flattens out into the horizontal downturned position once more.

The sequence of action is such that the dough is side swiped by the plate immediately the peg 41 has retracted rearwardly in the manner described, and is held in plan by centrifugal force. In the flattening out action which follows, the twisted dough is thrown onto a table surface conveyor, or the like, which forms no part of this invention.

When the troughs 15 and 15¹ have spiralled downwards sufficiently far to leave the dough hanging in a twisted condition, a pair of offset and opposed pinching fingers 130 and 130¹ rotate to pinch the lower end of the twisted dough strip together. These members travel in the direction of the arrows shown in Fig. 3, these fingers being actuated by a link and cam arrangement which will now be described.

Referring to Fig. 3, it will be seen that a pin 131 extends vertically through the lower right hand corner of the center portion 9, the finger being keyed to the upper end of the pin, while a lever 132 is keyed to the lower end thereof, beneath the center portion. A link 133 is attached to the free end of the lever 132, the free end of this member being attached to one arm of a bell crank 134 pivoted to the lower left hand corner of the center portion 9, still referring to Fig. 3. A link 135 is pivoted to the remaining arm of the bell crank 134 and extends rearwardly to be attached to one arm of a second bell crank 136 which is also pivoted to the rear left hand or top left hand corner of the center portion 9. The pin 137 upon which this member is pivoted, extends through the center portion and to the upper end thereof is keyed the finger 130.

To the remaining arm of the bell crank 136 is a link 138 which terminates in a rocker arm 139 mounted upon a vertically disposed pin 140 located upon the under side and adjacent the extremity of an arm 10¹. This rocker arm terminates at the opposite end thereof in a cam follower 141, said cam follower being designed to engage with a strap cam 142 of the configuration clearly shown in Fig. 3 attached to the head bracket 2.

When the head section is approaching the lower end of its travel, the effect of the movement of the follower over the breast portion 143 of the cam 142, will obviously cause the fingers 130 and 130¹ to move rapidly in a counter clockwise direction, in this way pinching the lower ends of the hanging dough strip 40.

It will be understood that the pinching of the lower end of the hanging twisted dough strip will take place immediately prior to the side swiping action and the withdrawal of the pin 41, and from the curvature of the cam 142, it will be seen that the fingers return to the position shown in Fig. 3 as the head continues its spiral descent.

Upon the commencement of the spiral upward travel of the head, the fingers 130 and 130¹ will perform an idle pinching action and then return again to the position shown in Fig. 3, under the influence of the spring 144 which extends around the pin 140, one end being secured to the pin head 145 secured to the end of the pin 140, the other to the pivoted hub portion of the rocker arm 139 which is journalled upon the said pin.

I would mention at this point, that the cam follower 99 is kept in contact with the face of the cam 94 by means of a pair of springs 146, one end of each of which is secured within a small drilling upon the inner side of each of the bearings 102, while the opposite end of each of the said springs is received into a drilling upon the rod 101² which forms part of the bell crank action illustrated most clearly in Figs. 2 and 4 for the purpose of transmitting motion from the rod 95 to the rod 103.

In describing the structure of my dough twisting mechanism as illustrated, it should be mentioned that a very important function is performed by the corrugated rollers 27 and 27¹. As previously mentioned, each of these rotates in opposite directions, the roller 27 in a clockwise direction, looking towards the front of the machine when the head is at the top of its spiral return travel, and the roller 27¹ in a counter clockwise direction when the head is in this position.

The reason for the provision of these two rollers is to urge the two halves of the twisted dough strip lying in the troughs 15 and 15¹ around each other as they hang upon the peg 41 and the head descends. The provision of these rollers is largely instrumental in preventing one or the other of the two halves of the twisted dough strip from hanging in a more or less vertical position with the other strip coiling around it. With this arrangement, they both coil uniformly around each other.

It should be observed that when looking towards the front of the machine, the upper entrance 147 of the spiral slot 36 is upon the left hand side or 90° with respect to a plane extending from front to rear of the machine at the center or right hand side thereof, and when the head is at the top of its spiral travel, the pin 37 is directed towards the front of the machine. Thus, when a strip of dough falls over the peg 41 and into the troughs, thereby closing the circuit already described, the head rotates horizontally in a clockwise direction before the pin 47 enters the slot.

The purpose of this arrangement is to make up for the vertical distance between the peg 41 and the troughs 15 and 15¹ and to insure that the commencement of the first twist will be substantially uniform with the remaining twists in the dough which take place as the head descends.

In Fig. 10 I have shown a diagrammatic view illustrating approximately the sequence of action which takes place in one revolution of the pulley 66, this diagram being only approximately correct and being introduced for illustrative purposes only.

It has been previously mentioned herein that one revolution of the driving pulley 66 represents a complete cycle of operations in the machine from the time the head D commences its downward travel to the time it returns to its original upper position, the arc 148 representing the downward spiral travel of the troughs, and the arc 149 representing the upward spiral travel return thereof, the vertically disposed diametric line 150 representing the starting point.

At the point of rotation of the driving pulley 66 represented by the diametrically disposed line 150¹, the operation of the pinching fingers 130 and 130¹ commences, this operation being concluded and the fingers returning to their normal position by the time the pulley has rotated to the diametrically disposed line 151. The sector 152 between the diametrically disposed lines 151 and 153 represents the distance which the troughs travel downwardly after the outer ends of the dough have left the troughs and the same are hanging twisted around each other upon the peg 41.

The sector 155 between the lines 154 and 156, represents the portion of the revolution of the driving pulley 66 during which the circuit between the switch and the clutch solenoid is broken by the removal of the dough from the peg.

The sector 157, between the lines 154 and 158 represents the rotation of the wiper mechanism, while the sector 159, between the lines 158 and 160 represents the remainder of the return of the travel of the head.

The operation of the clutch mechanism is believed clearly apparent from Figs. 7 and 8.

At this point I would draw attention to the operation of the switch clutch mechanism and the solenoid 61 in which it will be noted that contact between the leads 59 and the solenoid 61 is broken as soon as the dough is wiped off the peg. This removal of the downward pressure exerted by the dough, causes a spring 46 to rotate the rod 42 about the pivotal point 44 which causes the rear forked end 54 thereof within the switch box 52 to rotate downwardly, thereby causing the tube 57¹ to travel in a counter clockwise direction, which will precipitate the mercury therein to the left hand end thereof. As soon as this takes place, the pin 61 in the solenoid is spring shot, and is ready to be struck by the lever 62, first disengaging the ratchet 63 when the same is rotated one revolution, at which point, of course, another strip of dough falls upon the peg, and the cycle of operations, mechanical and electrical already described, is repeated.

In Fig. 15, I have illustrated a cross section of the twisted dough strip forward by my machine, the curved radiating lines indicating the direction of distortion which the grain is caused to take as the individual strands are twisted. From this illustration, it will be seen that each strand is subjected to a clockwise tortion, while the two strands wind around each other in a counter clockwise direction. The grain of each strand tends to cause the same to unwind in a counter clockwise direction and it is this same tendency for each strand to unwind against each other both in a counter clockwise direction which causes the twisted rolled dough strip to remain in a twisted condition after it has left the machine, this problem of maintaining the twist, being one which has hitherto been unsolved to the best of my knowledge and belief, in the art of twisting dough for twisted loaves.

It will be noted with reference to Figs. 5 and 6, that I have shown substantially vertical lines upon the dough strips, these illustrating the appearance of the grain on the surface of the twisted strips when a roll is being twisted.

I would finally mention that my troughs 15 and 15¹ are offset for the purpose of facilitating the twisting of one strand of dough around the other, as I have found that if the troughs are in alignment one with the other, one coil will wind around the other while the latter remains vertical.

The function of my corrugated feed rollers 27 and 27¹ is also most important, as the corrugations thereof bite into one or the other of the dough strips as clearly shown in Fig. 5, and maintain a natural rate at which the dough withdraws from the trough and feeds into the twisted state. They serve to prevent either half of the strip from lagging back in the trough and stretching, or from prematurely feeding into the twisted state. When either of such conditions take place, one of the strips tends to hang straight, while the other coils around it and perfect strip of rolled and twisted dough will not be discharged from the machine to bake into a well-shaped loaf. In this device it will have been observed that I make use of one long piece of rolled dough which is delivered onto my machine from an adjacent rolling machine, but obviously a pair of separate strips could be delivered simultaneously from adjacent rolling machines, one onto each of my troughs. In such a case, I might replace the peg with an element designed to grip the inner end of each of the strips of dough, the pieces being thus parts of the whole strip which fall into each trough.

I therefore prefer to refer in the following claims to the dough deposited into my machine as elongated pieces of rolled dough for the purpose of more clearly acclaiming this structure.

Since various modifications can be made in the above invention, and many apparently widely different embodiments of same made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:

1. In a mechanical device for twisting elongated pieces of dough, means for imparting torsion about the longitudinal axes of said pieces and means for twisting said pieces so that they assume a spiral formation, the degree of said torsion being in excess of that which would normally take place in the operation of twisting said pieces into said spiral formation when said pieces are held at one end thereof.

2. In a mechanical device for twisting elongated pieces of dough one about the other to produce a pair of entwined rolls having a straight common axis for the production of twisted bread, a plurality of troughs for receiving said elongated pieces of said dough, means for withdrawing said pieces of dough from said troughs comprising an element engageable with said pieces of dough at one end thereof, the said pieces of dough being twisted so as to assume a spiral formation upon leaving said troughs.

3. The device as claimed in claim 2 in which means are provided to process the pieces of dough hanging from said element to seal the ends thereof and prevent the untwisting of said ends.

4. The device as claimed in claim 2 in which means are provided integral with said troughs to rotate the pieces of dough lying therewithin to impart to the said pieces a torsion about the longitudinal axes thereof as they are withdrawn from said troughs and hang in a spiral formation upon said element.

5. The device as claimed in claim 2 in which means are provided for detachment of said pieces of dough from said element.

6. In a mechanical device for twisting elongated pieces of dough to a spiral formation, a plurality of substantially opposed troughs for receiving said elongated pieces of dough, said troughs consisting of a plurality of longitudinally disposed rotating members, means for withdrawing said pieces of dough from said troughs consisting of an element engageable with said pieces of dough, said dough being rotated within said troughs and twisting to a spiral formation upon withdrawal therefrom.

7. The device as claimed in claim 6 in which means are provided for removal of said pieces of dough from said device after withdrawal from said troughs.

8. In a mechanical device for twisting elongated pieces of dough to a spiral formation, a plurality of dough receiving troughs, said troughs being designed to twist the pieces of dough lying therewithin, means adjacent one end of each of said troughs for withdrawing the pieces of dough therefrom, a dough engaging element adjacent the inner end of said troughs, said pieces of dough being held at one point by said element against rotation about the longitudinal axes thereof, means for twisting said pieces of dough into a spiral formation after leaving said troughs, the said pieces of dough hanging in the said spiral formation upon said element.

9. The device as claimed in claim 8 in which means are provided for removing said pieces of dough from said device after withdrawal from said troughs.

10. The device as claimed in claim 8 in which means are provided for sealing the ends of said pieces of dough as they hang upon the said element.

11. In a mechanical device for twisting elongated pieces of dough to a spiral formation consisting of a pair of substantially opposed troughs rotatable about a common axis, said troughs comprising a plurality of longitudinally disposed rotatable members, feed rollers between said troughs, a dough engaging element between said troughs, means for rotating said troughs about said common axis, means for rotating the members comprising said troughs, means for withdrawing said pieces of dough from said troughs upon rotation thereof and cause the same to hang in a spiral formation upon said element.

12. In a mechanical device for doubling and spiralling a strip of dough about itself, means for accomplishing the operation of doubling the strip into a pair of juxtaposed strands and means for spiralling said strands one about the other for the major portion of the length thereof.

13. The mechanism defined in claim 12 in which means are provided in association with said means for spiralling said strands for controlling the strands as they are spiralled one about the other.

14. The mechanism defined in claim 12 in which rotatable elements are provided in association with said means for spiralling said strands for controlling the strands as they are spiralled one about the other.

15. The mechanism defined in claim 12 in which feed rollers are provided in association with said means for spiralling said strands for controlling the strands as they are spiralled one about the other.

16. In a mechanical device for doubling and spiralling a strip of dough about itself for the major portion of its length including at least two dough receiving troughs, means for controlling the behaviour of said dough upon removal thereof from said troughs, comprising an element adjacent one end of each of said troughs rotatable at a predetermined speed upon the actuation of said mechanism.

17. In a mechanical device for simultaneously spiralling at least two pieces of dough each around the other for the major portion of their length, at least two troughs, a dough engaging element at the ends of the troughs, means for intermittently separating the troughs and said element and means for spiralling said dough while engaged by said element and as said dough leaves said troughs.

FREDERIC LANGTRY van ALLEN.